Nov. 20, 1945.  K. O. KEARNEY  2,389,436
DIFFERENTIAL WIDENING MEANS FOR CONTROL STRUCTURES
Filed Nov. 17, 1944  2 Sheets-Sheet 1
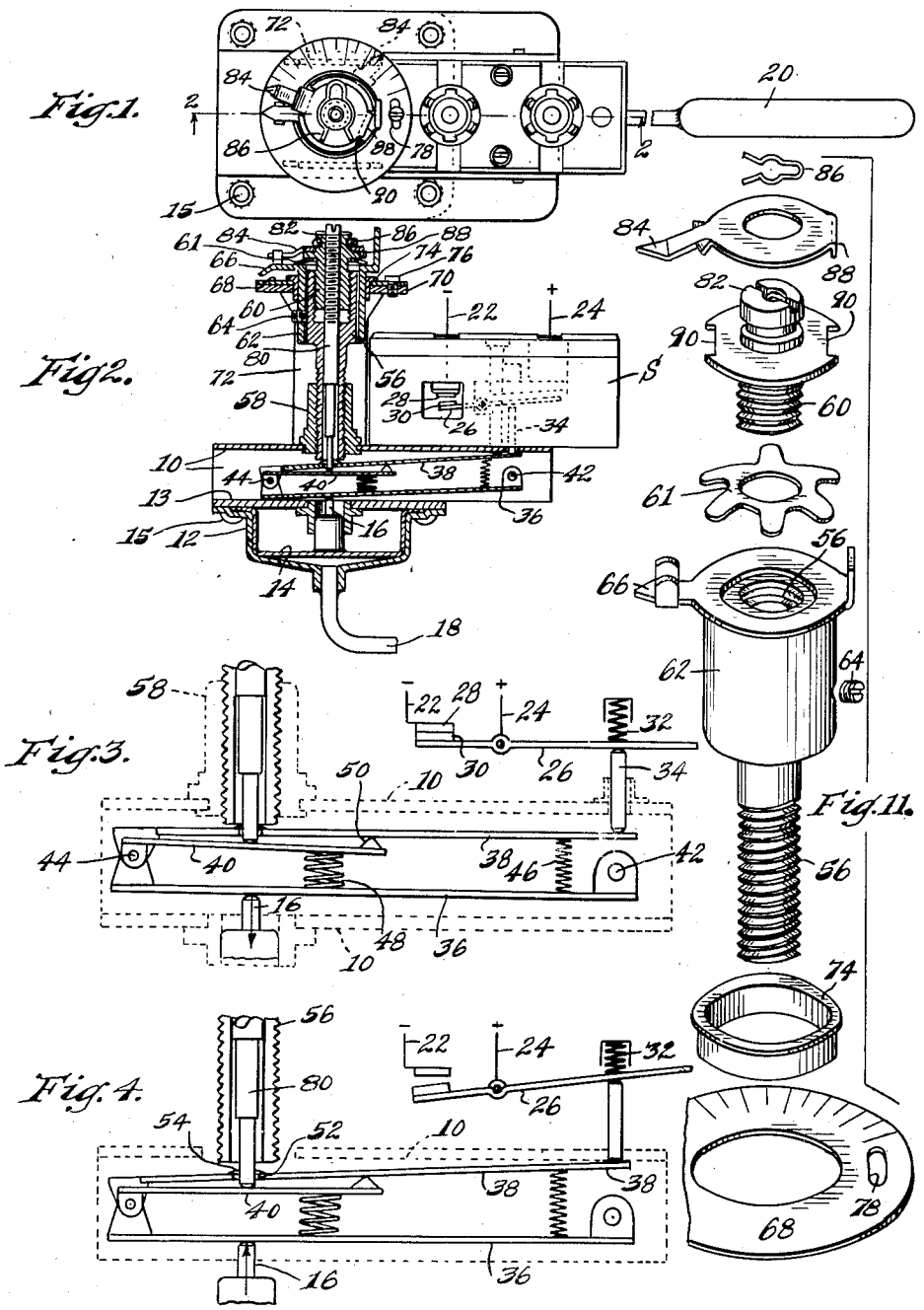
Inventor:
Kenneth O Kearney
By Bair & Freeman
Atty's Patented Nov. 20, 1945

2,389,436

UNITED STATES PATENT OFFICE 2,389,436

DIFFERENTIAL WIDENING MEANS FOR CONTROL STRUCTURES

Kenneth O. Kearney, St. Louis, Mo., assignor to Penn Electric Switch Co., Goshen, Ind., a corporation of Iowa Application November 17, 1944, Serial No. 563,963

14 Claims. (Cl. 200—83)

My present invention relates to a control structure having a leverage and adjusting screw arrangement that permits of widening the differential of the switch as desired within the limits of adjustment.

One object of the invention is to provide a leverage system which can be interposed between a power element and a control device, and an adjusting means therefor which can change the range of operation of the control structure and also the differential of operation thereof by means of range and differential adjusting screws which are provided with pointers coacting with a dial to indicate the range and differential.

Another object is to provide the leverage system, including actuated and actuating levers with a range adjusting screw serving as a stop to be engaged by the actuating lever so that the range of operation is thereby determined and to provide another adjusting screw which cooperates with a differential widening lever to either permit a minimum width of differential or any desired width greater than minimum within the capablities of the control device.

Still another object is to provide the differential adjusting screw carried by the range adjusting screw so that when the range is changed, the differential adjustment will be retained and can then be operated independent of the range adjustment, the design being such that both range and differential width are indicated on the same dial.

A further object is to provide a factory adjustment between the differential adjusting screw and the range adjusting screw which permits of adjusting them in relation to each other so that there is absolute minimum of differential adjustment in the control structure when the range and differential pointers are as close together as they can be adjusted.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of a control structure embodying my invention.

Figure 2 is a vertical sectional view on the line 2—2 of Figure 1 showing an outside elevation of a switch unit used in connection with the control structure.

Figure 3 is an enlarged diagrammatical view showing the switch closed and the parts adjusted for minimum differential.

Figures 4 to 8 are similar views showing the differential adjusted to a wider value and successive positions of the various parts of the control structure from the time the switch is open in Figure 4 through closure in Figure 6 and again open in Figure 8.

Figure 5:
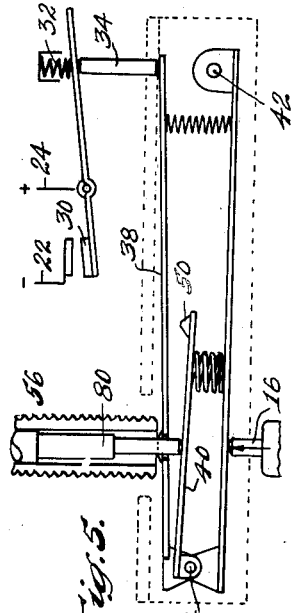
Figure 6:
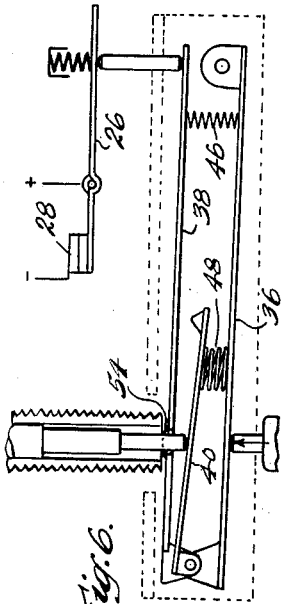
Figure 9:
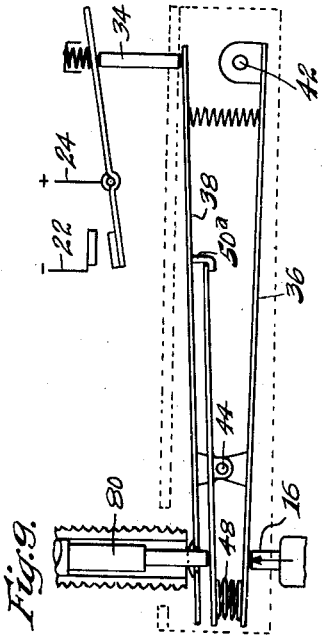
Figure 7:
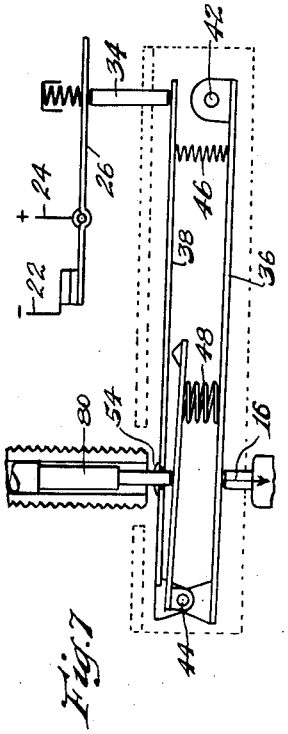
Figure 8:
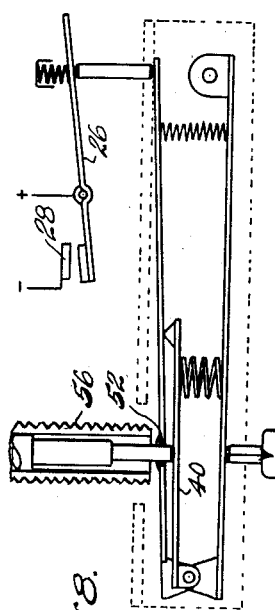
Figure 10:
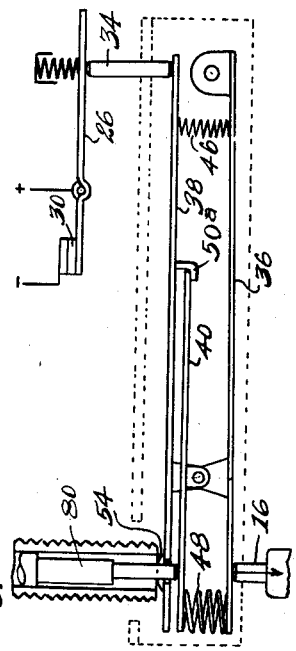

Figures 9 and 10 are similar views showing a reversal of the leverage for the opening and closing of the switch in these two figures respectively as distinguished from the closing and opening of Figures 6 and 8 respectively, Figures 9 and 10 being for a heater control whereas Figures 1 to 8 are for a cooling or refrigerating control, and Figure 11 is an exploded, perspective view of the adjusting screws of my control structure and their associated parts.

On the accompanying drawings I have used the reference numeral 10 to indicate a stationary frame of my control structure. The frame 10 is channel shaped in cross section and has a bottom plate 13 secured thereto. The bottom plate 13 has a power element mounted thereon comprising a housing 12 having a diaphragm 14 therein. The housing 12 is secured to the bottom plate 13 as by screws 15. The diaphragm 14 is provided with an actuating pin 16 and a capillary tube 18 extends from a capillary bulb 20 into the housing 12. The housing below the diaphragm, the capillary tube and the capillary bulb are suitably charged with a liquid that expands in response to heat applied to the bulb 20 and thereby produces a pressure in the housing 12 for bowing the diaphragm 14 upwardly. In place of the diaphragm any power means, producing movement of the actuating pin 16, can be utilized for operating the control structure as the present invention is not limited to temperature or pressure operation.

Secured to the frame 10 is a switch unit S with which current wires, such as 22 and 24, are connected and the switch unit includes a switch arm 26, a stationary contact 28 and a movable contact 30 shown diagrammatically on the drawings. The contact 30 is biased to engage the contact 28 by a spring 32. An actuating pin 34 is provided for operating the switch unit and extends slidably through the upper wall of the frame 10 as indicated in Figure 3.

An operative connection is provided between the actuating pin 16 of the power element 12—14 and the actuating pin 34 of the switch unit S comprising an actuated lever 36, an actuating lever 38 and a differential widening lever 40. The lever 36 is pivoted at one end on a pin 42 carried by the sides of the frame 10 and at its other end carries a pivot pin 44 which is movable. One end of the actuating lever 38 is pivoted on the pin 44 and its other end is adapted to engage the switch actuating pin 34. A light spring 46 is used which has sufficient force only to hold the switch unit in open circuit position once it has been moved to that position. The differential widening lever 40 is also pivoted at one end on the pivot pin 44 and a spring 48 is interposed between its other end and the actuated lever 36. The lever 40 has a contact 50 to mechanically engage the lever 38 for a purpose which will hereinafter appear.

The actuating lever 38 has an opening 52 therein and on opposite sides thereof a pair of projections 54. A range adjusting screw 56 has its lower end adapted at times to engage the projections 54 and the screw is threaded in a stationary sleeve 58 secured to the web of the frame 10. The range adjusting screw is tubular as illustrated and has a sleeve 60 threaded in an enlarged upper portion of the screw. A second sleeve 62 surrounds the upper portion of the range adjusting screw 56 and may be locked in various adjusted positions relative thereto by a set screw 64. The sleeve 62 has a pointer 66 adapted to cooperate with a dial 68 to indicate the range for which the control structure is set.

The dial 68 is mounted on a cross piece 70 of an inverted, U-shaped sub-frame having a pair of legs 72 extending downwardly to the frame 10 and secured thereto. The cross piece 70 carries a bushing 74 in which the sleeve 62 is journalled. The dial 68 may be adjusted slightly relative to the cross piece 70 by a clamp screw 76 extending through an arcuate slot 78 cut out of the dial.

The sleeve 60 is internally screw-threaded and a differential screw 80 is threaded therein and has a grooved head 82. The sleeve 60 has a pointer 84 extending therefrom and also adapted to coact with the dial 68. The pointer 84 indicates width of differential, with minimum differential when the pointers 66 and 84 close together being illustrated in Figure 1, whereas a wider differential would be indicated by the pointer 84 moved away from the pointer 66 as to the dotted position illustrated. A keeper wire 86 is associated with the groove of the head 82 to retain the pointer 84 in position, which pointer has a lug 88 coacting with a notch 90 of the sleeve 60 to affix the pointer to the sleeve.

*Practical operation*

In the operation of my switch structure, with the pointers 66 and 84 adjusted for minimum differential as shown by solid lines in Figure 1, the lower end of the range adjusting screw 56 touches the projections 54 of the actuating lever 38. At the same time the lower end of the differential screw 80 contacts the differential widening lever 40 when the contact 50 is in engagement with the lever 38. To insure that contact of 56 with 54 and 80 with 40 is simultaneous when 50 engages with 38, the differential adjusting screw 80 is threaded in the sleeve 60 rather than directly in the range adjusting screw 56. Accordingly the sleeve 60 can be adjusted so that its pointer 84 is as close to the pointer 66 as it can be located, as shown by full lines in Figure 1, and the screw 80 then adjusted up or down until proper contact with the lever 40 is made. The lock nut 82 can then be tightened. With the control structure set at minimum differential, the lever 40 performs no function and accordingly the levers 36 and 38 are the only ones that enter into the operation. As the actuating pin 16 moves downwardly from the position shown in Figure 3, the projections 54 being in contact with the screw 56 will permit the spring 48 to readily overcome the force of the spring 32 to move the righthand end of the lever 36 upwardly for opening the switch to the position shown for instance in Figure 4. When the actuating pin 16 moves upwardly, it will raise the pivot 44 and the lever 38 will pivot about the lower end of the screw 56 where the projections 54 are contacting and thus depress the righthand end of the lever 38 to permit the spring 32 to close the switch as to the position of Figure 3. These operations will occur without any lost motion between the projections 54 and the lower end of the range adjusting screw 56 so that minimum differential is had.

When the control structure is adjusted for a wider differential, as shown by the dotted pointer 84 in Figure 1, then the relation of the differential adjusting screw 80 at its lower end to the lower end of the screw 56 will be greater as for instance shown in Figure 4. Assuming the switch to be open, upward movement of the power element actuating pin 16 will result in first a movement of the differential widening lever 40, since the righthand end of the lever 38 is stopped against the web of the frame 10 (Figure 4). During this operation the pivot pin 40 is moving upwardly and thereby raising the projections 54 so that they contact the lower end of the screw 56 following which the righthand end of the actuating lever 38 will be depressed and the switch closed as in Figure 6. The differential has now been widened by the distance that the projections 54 have to travel from Figure 4 until they contact (at a position between the positions shown in Figures 5 and 6) with the range adjusting screw.

In the opening movement of the control structure the first movement will permit the pivot pin 44 to move downwardly as to the position of Figure 7 with the projections 54 spaced from the screw 56 until contact is made between 56 and the lever 38. Thereafter further downward movement results in the spring 48 raising the right-hand end of the lever 38 as in Figure 8 to open the switch and position the parts again as in Figure 4. Again the amount of movement from Figure 6 to Figure 7 determines the wideness of the differential as the projections 54 leave the screw 56 until contact between 50 and 38 occurs instead of contact of the parts remaining throughout the opening and closing operations as for minimum differential explained in connection with Figure 3.

Obviously, the further apart the lower ends of the screws 56 and 80 are, the wider will be the differential. Thus with the structure disclosed I am able to have either narrow or wide differential or any degree of differential width between minimum and maximum and the resulting width is readily indicated on the single dial 68 with the range for which the control structure is adjusted. The dial, of course, can be suitably calibrated to indicate temperature, pressure or any condition appropriate for the particular control structure involved.

In general, it may be stated that the levers 38 and 40 perform two distinct functions, 38 overcoming a spring 46 to allow the circuit to make and lever 40 operating to break the circuit. The adjusting screw 56 and the lever 38 determine the point for making the circuit and the screw 80 and lever 40 determine the point at which the circuit breaks.

In Figures 9 and 10 I show the open and closed positions, respectively, of a switch unit used in connection with a heater installation as distinguished from a refrigeration installation as in the previous figures of the drawings. In other words, an increase in pressure or upward movement of the actuating pin 16 results in closing the switch rather than opening it. To accomplish this purpose it is merely necessary to reverse the positions of the power element and the pivot 44 as illustrated and likewise the position of the spring 48. The adjusting screws 56 and 80 are still mounted in alignment with the power element actuating pin. Instead of a contact 50 for upward engagement of the lever differential widening lever 40 with the actuating lever 38, a bracket 50a is provided for downward engagement of 40 with 38. It is believed obvious how the structure operates to widen the differential in the same manner as described in connection with Figures 1 to 8, to secure either narrow or wide differential as desired.

The bracket 50a gives the desired action in reverse for heating controls as distinguished from refrigeration controls described in Figures 4 to 8.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a control structure, an actuated lever movably mounted, an actuating lever pivoted thereto, a control device for actuation by said actuating lever, a power element for moving said actuated lever, a range determining stop engageable by said actuating lever in opposition to said power element whereby movement of said power element is translated into movement of said actuating lever to actuate said control device, and means for widening the differential of operation of said actuating lever comprising a differential widening element adapted to engage said actuating lever, a spring to effect such engagement, and a differential determining stop engageable by said differential widening lever to permit pivotal movement of said differential widening lever relative to said actuated and actuating levers while said power element moves said last levers, and said range determining stop becoming effective to stop movement of said actuating lever and thereupon effect movement thereof to operate said control device.

2. In a control structure, a movable actuated element, a movable actuating element pivoted thereto, a control device for actuation by said actuating element, a power element for moving said actuated element, a range adjusting screw engageable by said actuating element in opposition to said power element whereby movement of said power element is translated into movement of said actuating element to actuate said control device, means for widening the differential of operation of said actuating element comprising a differential widening element pivoted to said actuated and actuating elements and adapted to engage said actuating element, said control device opposing movement of said actuating element, a spring interposed between said actuated element and said differential widening element and a differential adjusting means engageable by said differential widening element to permit pivotal movement of said last element relative to said actuated and actuating elements while said power element moves them, said range adjusting screw becoming effective to stop movement of said actuating element and thereupon effect movement thereof to operate said control device.

3. In a control structure, a movable actuated element, a movable actuating element pivoted thereto, a control device for actuation by said actuating element, a power element for moving said actuated element, a stop engageable by said actuating element in opposition to said power element whereby movement of said power element is translated into movement of said actuating element to actuate said control device, means for widening the differential of operation of said actuating element comprising a differential widening element pivoted to said actuated and actuating elements and adapted to engage said actuating element, said control device opposing movement of said actuating element, a spring interposed between said actuated element and said differential widening element and a differential adjusting means engageable by said differential widening element to permit pivotal movement of said last element relative to said actuated and actuating elements while said power element moves them, said stop becoming effective to stop movement of said actuating element and thereupon effect movement thereof to operate said control device.

4. In a control structure, a movable actuated element, a movable actuating element pivoted thereto, a control device for actuation by said actuating element, a power element for moving said actuated element, a stop engageable by said actuating element in opposition to said power element whereby movement of said power element is translated into movement of said actuating element to actuate said control device, means for widening the differential of operation of said actuating element comprising a differential widening element pivoted to said actuated and actuating elements and adapted to engage said actuating element, said control device including a spring opposing movement of said actuating element, a spring interposed between said actuated element and said differential widening element and stronger than the spring of said control device, and a differential adjusting means engageable by said differential widening element to permit pivotal movement of said last element relative to said actuated and actuating elements while said power element moves them, said stop becoming effective to stop movement of said actuating element and thereupon effect movement thereof to operate said control device.

5. A control structure comprising an actuated lever movably mounted, an actuating lever pivoted thereto, a control device for actuation by said actuating lever, a power element for moving said actuated lever, a range adjusting screw engageable by said actuating lever in opposition to said power element whereby movement of said power element is translated into movement of said actuating lever to actuate said control device, and means for widening the differential of operation of said actuating lever comprising a differential widening lever pivoted to said actuated and actuating levers and adapted to engage said actuating lever, a differential adjusting screw through said range adjusting screw and carried thereby, said differential adjusting screw being engageable by said differential widening lever to permit pivotal movement of said differential widening lever relative to said actuated and actuating levers while said power element moves said last levers, and said range adjusting screw being engaged by said actuating lever after the differential determining play has been taken up to stop movement of said actuating lever and thereupon effect movement thereof to operate said control device.

6. In a control structure, an actuated lever movably mounted, an actuating lever pivoted thereto, a control device for actuation by said actuating lever, a power element for moving said actuated lever, a range determining stop engageable by said actuating lever in opposition to said power element whereby movement of said power element is translated into movement of said actuating lever to actuate said control device, means for widening the differential of operation of said actuating lever comprising a differential widening lever pivoted to said actuated and actuating levers and adapted to engage said actuating lever, said control device including a spring opposing movement of said actuating lever, a spring for operating said differential widening lever and through it said actuating lever, said last spring being stronger than the spring of said control device, and a differential determining stop engageable by said differential widening lever to permit pivotal movement of said differential widening lever relative to said actuated and actuating levers while said power element moves said last levers, and said range determining stop becoming effective to stop movement of said actuating lever and thereupon effect movement thereof to operate said control device upon further movement of said actuating lever.

7. A control structure comprising an actuated lever movably mounted, an actuating lever pivoted thereto, a control device for actuation by said actuating lever, a power element for moving said actuated lever, a range adjusting screw engageable by said actuating lever in opposition to said power element whereby movement of said power element is translated into movement of said actuating lever to actuate said control device, and means for widening the differential of operation of said actuating lever comprising a differential widening lever adapted to engage said actuating lever, a spring to effect such engagement, and a differential adjusting screw engageable by said differential widening lever to permit pivotal movement of said differential widening lever relative to said actuated and actuating levers while said power element moves said last levers, said range adjusting screw becoming effective to stop movement of said actuating lever and thereupon effect movement thereof to operate said control device, said differential widening screw being carried by said range adjusting screw and thereby movable therewith to retain the differential adjustment during adjustment of said range adjusting screw.

8. In a control structure, an actuated lever movably mounted, an actuating lever pivoted thereto, a control device for actuation by said actuating lever, a power element for moving said actuated lever, a range adjusting screw engageable by said actuating lever, means for widening the differential of operation of said actuating lever comprising a differential widening lever pivoted to said actuated and actuating levers and adapted to engage said actuating lever, and a differential adjusting screw engageable by said differential widening lever to permit limited pivotal movement of said differential widening lever relative to said actuated and actuating levers while said power element moves said last levers and before said range adjusting screw becomes effective to stop movement of said actuating lever whereupon said control device is operated, said differential widening screw being carried by said range adjusting screw and thereby movable with it to retain the differential adjustment as the range adjustment is changed, and a common dial for both screws to indicate both range setting and differential width.

9. A control structure comprising an actuated lever movably mounted, an actuating lever pivoted thereto, a control device for actuation by said actuating lever, a power element for moving said actuated lever, a range adjusting screw engageable by said actuating lever in opposition to said power element whereby movement of said power element is translated into movement of said actuating lever to actuate said control device, means for widening the differential of operation of said actuating lever comprising a differential widening lever pivoted to said actuated and actuating levers and adapted to engage said actuating lever, a differential adjusting screw engageable by said differential widening lever to permit pivotal movement of said differential widening lever relative to said actuated and actuating levers while said power element moves said last levers and said range adjusting screw becoming effective to stop movement of said actuating lever and thereupon effect movement thereof to operate said control device, said range adjusting screw being threaded in a stationary portion of said control structure, a sleeve threaded in said range adjusting screw, said differential adjusting screw being threaded in said sleeve, and means for locking said differential adjusting screw relative to said sleeve in a position of minimum differential where said range adjusting screw and said differential adjusting screw both substantially contact said actuating lever and said differential widening lever while they are in contact with each other.

10. In a control structure, an actuated lever pivotally mounted, an actuating lever pivoted thereto, a control device for actuation by said actuating lever, a power element for moving said actuated lever, a range adjusting screw engageable by said actuating lever, and means for widening the differential of operation of said actuating lever comprising a differential widening lever pivoted to said actuated and actuating levers and adapted to engage said actuating lever, a differential adjusting screw engageable by said differential widening lever to permit pivotal movement of said differential widening lever relative to said actuated and actuating levers while said power element moves said last levers and before said range adjusting screw becomes effective to stop movement of said actuating lever and thereupon effect movement thereof to operate said control device, said range adjusting screw being threaded in a stationary portion of the control structure, said differential adjusting screw being threaded in said range adjusting screw, said screws each having a pointer which when together indicate minimum differential and indicate widened differential in proportion to the spread between said pointers.

11. A control structure comprising an actuated lever movably mounted, an actuating lever pivoted thereto, a control device for actuation by said actuating lever, a power element for moving said actuated lever, a range adjusting screw engageable by said actuating lever, means for widening the differential of operation of said actuating lever comprising a differential widening lever pivoted to said actuated and actuating levers and adapted to engage said actuating lever, a differential adjusting screw engageable by said differential widening lever to permit pivotal movement of said differential widening lever relative to said actuated and actuating levers while said power element moves said last levers, said range adjusting screw becoming effective to stop movement of said actuating lever and thereupon effect movement thereof to operate said control device, said range adjusting screw being threaded in a stationary portion of said control structure and having a pointer, a dial cooperating with said pointer to indicate the range, said differential adjusting screw being threaded relative to said range adjusting screw and carried thereby, said differential adjusting screw having a pointer also cooperating with said dial to indicate the width of the differential and to cooperate with the pointer of said range adjusting screw to indicate the upper and lower limits of range in various positions of the differential adjusting pointer relative to the range adjusting pointer, and an adjustable connection between said range adjusting screw and said differential adjusting screw to initially position the two screws for simultaneous engagement with the actuating and the differential widening levers respectively to thereby secure a minimum differential relation of the two pointers.

12. A control structure comprising an actuated lever movably mounted, an actuating lever pivoted thereto, a control device for actuation by said actuating lever, a power element for moving said actuated lever, a range adjusting screw engageable by said actuating lever, means for widening the differential of operation of said actuating lever comprising a differential widening lever pivoted to said actuated and actuating levers and adapted to engage said actuating lever, a differential adjusting screw engageable by said differential widening lever to permit pivotal movement of said differential widening lever relative to said actuated and actuating levers while said power element moves said last levers, said range adjusting screw becoming effective to stop movement of said actuating lever and thereupon effect movement thereof to operate said control device, said range adjusting screw being threaded in a stationary portion of said control structure and having a pointer, a dial cooperating with said pointer to indicate the range, said differential adjusting screw being threaded relative to said range adjusting screw and carried thereby, said differential adjusting screw having a pointer also cooperating with said dial to indicate the width of the differential and to cooperate with the pointer of said range adjusting screw to indicate the upper and lower limits of range in various positions of the differential adjusting pointer relative to the range adjusting pointer.

13. In a device of the class described, an actuated lever movably mounted, an actuating lever pivoted thereto, a control switch for actuation by said actuating lever, a power element for moving said actuated lever, a range adjusting screw engageable by said actuating lever in opposition to said power element whereby movement of said power element is translated into movement of said actuating lever to actuate said control switch, means for widening the differential of operation of said actuating lever comprising a differential widening lever pivoted to said actuated and actuating levers and adapted to engage said actuating lever, a differential adjusting screw engageable by said differential widening lever to permit pivotal movement of said differential widening lever relative to said actuated and actuating levers while said power element moves said last levers and said range adjusting screw becoming effective to stop movement of said actuating lever and thereupon effect movement thereof to operate said control device, and an adjustable connection between said range adjusting screw and said differential adjusting screw to initially position the two screws for simultaneous engagement with the actuating and the differential widening levers respectively to thereby secure a minimum differential relation of the two screws.

14. In a device of the class disclosed, an actuated lever pivotally mounted, an actuating lever pivoted thereto, a control switch for actuation by said actuating lever, a power element for moving said actuated lever, a range determining stop engageable by said actuating lever, means for widening the differential of operation of said actuating lever comprising a differential widening lever pivoted to said actuated and actuating levers and adapted to engage said actuating lever, a differential adjusting screw engageable by said differential widening lever to permit pivotal movement of said differential widening lever relative to said actuated and actuating levers while said power element moves said last levers before said range determining stop becomes effective to stop movement of said actuating lever and thereupon effect movement thereof to operate said control switch.

KENNETH O. KEARNEY.